United States Patent [19]

Hayashikura et al.

[11] Patent Number: 5,654,715
[45] Date of Patent: Aug. 5, 1997

[54] VEHICLE-SURROUNDINGS MONITORING APPARATUS

[75] Inventors: Yuitsu Hayashikura; Shigeki Kato; Katsuhiko Takebe; Yasushi Okada, all of Wako, Japan

[73] Assignee: Honda Giken Kogyo Kabushiki Kaisha, Tokyo, Japan

[21] Appl. No.: 573,114

[22] Filed: Dec. 15, 1995

[51] Int. Cl.[6] ................................................ G01S 13/93
[52] U.S. Cl. .............................................................. 342/70
[58] Field of Search ................................. 342/70, 71, 72, 342/41, 127, 134, 142, 137; 348/116; 340/904

[56] References Cited

U.S. PATENT DOCUMENTS

| | | | |
|---|---|---|---|
| 4,349,823 | 9/1982 | Tagami et al. | 342/70 |
| 4,885,590 | 12/1989 | Hasan | 342/196 |

FOREIGN PATENT DOCUMENTS

| | | |
|---|---|---|
| 93201262.8 | 5/1993 | European Pat. Off. . |
| 0 569 095 A1 | 11/1993 | European Pat. Off. . |
| 62-88978a | 4/1987 | Japan . |
| 6-94829 | 6/1994 | Japan . |

*Primary Examiner*—Daniel T. Pihulic
*Attorney, Agent, or Firm*—Lyon & Lyon LLP

[57] ABSTRACT

A plurality of radar devices are provided on and along the periphery of a vehicle for monitoring in different directions. While sequentially switching the radar device to be used for the monitoring operation in response to a transmission-enable signal, a processing device detects, for each direction, presence of and distance to an obstacle or object on the basis of a phase difference (time difference) between signals transmitted and received via the corresponding radar device. Thus, the processing device causes an image display device to show the detected conditions around the vehicle and also causes a sound synthesizer to output a sound message to call the vehicle operator's attention.

3 Claims, 10 Drawing Sheets

VEHICLE-SURROUNDINGS MONITORING APPARATUS

BACKGROUND OF THE INVENTION

1. Field of the Invention

The present invention relates to a vehicle-surroundings monitoring apparatus which is capable of monitoring conditions around a vehicle by means of a plurality of electromagnetic wave transmitter and receiver sections (radar devices) provided on and along the periphery of the vehicle, to thereby inform the vehicle operator of the conditions around the vehicle and automatically restrict or control the operator's driving operation so as to safely avoid any possible obstacles or objects the vehicle may encounter.

2. Description of the Related Art

Japanese Patent Laid-open Publication No. HEI 6-94829 proposes a vehicle cruise controlling apparatus which employs an FM-CW (frequency-modulated continuous wave) radar device to determine a distance to a preceding vehicle so that the vehicle mounting this apparatus (hereinafter "user's vehicle") can operate on an automatic cruising mode while automatically adjusting its velocity in response to a varying vehicle distance to the preceding vehicle or automatically activate the brake when the distance goes below a predetermined limit.

The FM-CW radar device is however disadvantageous in that Doppler effect would prevent the device from accurately determining a distance to a preceding vehicle or object varying in its relative velocity to the user's vehicle. To address this inconvenience, the above-mentioned 6-94829 publication proposes a technique of estimating an accurate distance to a preceding object by transmitting a radio wave signal at a rate of r=f/t (where f represents the predetermined fundamental frequency of the signal, and t represents an estimated time). According to the proposed technique, the transmission rate r is set such that the frequency components of a differential signal resultant from a relative velocity between the object and the radar device corresponds to a distance over which the object should move relative to the radar device at the relative velocity within the estimated time t.

In addition, Japanese Patent Laid-open Publication No. SHO 62-88978 proposes a radar device which transmits a signal obtained by amplitude-modulating a carrier wave signal, determines a relative velocity between a possible object and the radar device on the basis of a frequency difference between the transmitted signal and a received signal reflected from the object, and also determines a distance to the object on the basis of a phase difference between the signal used to amplitude-modulate the carrier wave signal at the transmission end of the radar device and a demodulated signal obtained by demodulating the received signal at the reception end.

In recent years, there has been an increasing demand for an improved vehicle-mounted radar which permits monitoring conditions over an entire range around a vehicle, not just in front thereof, and which also effectively assists the vehicle operator's recognition and judgement in changing a route such as left- or right-turning, changing a lane, putting the vehicle into a garage, etc.

SUMMARY OF THE INVENTION

It is therefore a first object of the present invention to provide a vehicle-surroundings monitoring apparatus which is capable of monitoring conditions around a vehicle and effectively assisting a vehicle operator's recognition and judgement.

It is a second object of the present invention to provide a vehicle-surroundings monitoring apparatus employing a plurality of transmitter and receiver sections for monitoring conditions around a vehicle, which allows each of the transmitter and receiver sections to be substantially simplified in construction and made at reduced cost.

In order to accomplish the above-mentioned objects, a vehicle-surroundings monitoring apparatus according to the present invention comprises a plurality of transmitter and receiver sections provided on and along a periphery of a vehicle, each of the transmitter sections transmitting an electromagnetic wave, each of the receiver sections receiving a reflected wave from an object, a processing section for determining conditions around the vehicle on the basis of the respective signals received by the the individual receiver sections, and a display section for informing an operator of the vehicle about the conditions determined by the processing section.

In a preferred embodiment, each of the transmitter sections radiates the electromagnetic wave obtained by pulse-modulating or amplitude-modulating a carrier wave, and each of the receiver sections demodulates the received signal to output a demodulated signal. The processing section determines a distance to the obstacle on the basis of a phase difference between a signal used for modulating the carrier wave and the demodulated signal.

The modulating period of the carrier wave may be varied in accordance with a velocity of the vehicle.

The provision of the plurality of the transmitter and receiver sections on and along the entire periphery of the vehicle permits detection obstacles or the like over an entire (virtually 360°) range around the vehicle.

Further, because of the arrangement that the electromagnetic wave obtained by pulse-modulating or amplitude-modulating the carrier wave is transmitted and a distance to an obstacle is determined on the basis of a phase difference between the modulating signal of the transmitted wave and the demodulated signal obtained by demodulating the received signal reflected from the object, it is possible to substantially simplify the construction of the transmitter and receiver sections for the electromagnetic wave and the processing section for determining the distance.

Although the maximum detection range of the monitoring apparatus may be limited by the pulse-repetition or amplitude-modulating period of the transmitted signal, distant obstacles can be accurately detected by increasing the modulating period, when the vehicle is running at a high, velocity. Further, when the vehicle is running at a low velocity, it is possible to reduce a time necessary for the plurality of the transmitter and receiver sections to monitor conditions over the entire range around the vehicle, and thereby a varying distance to an obstacle can be detected with accuracy and properly informed to the vehicle operator very rapidly.

BRIEF DESCRIPTION OF THE DRAWINGS

For better understanding of various features of the present invention, the preferred embodiments of the invention will be described in detail hereinbelow with reference to the accompanying drawings, in which.

DETAILED DESCRIPTION OF THE PREFERRED EMBODIMENTS

Figure 1:
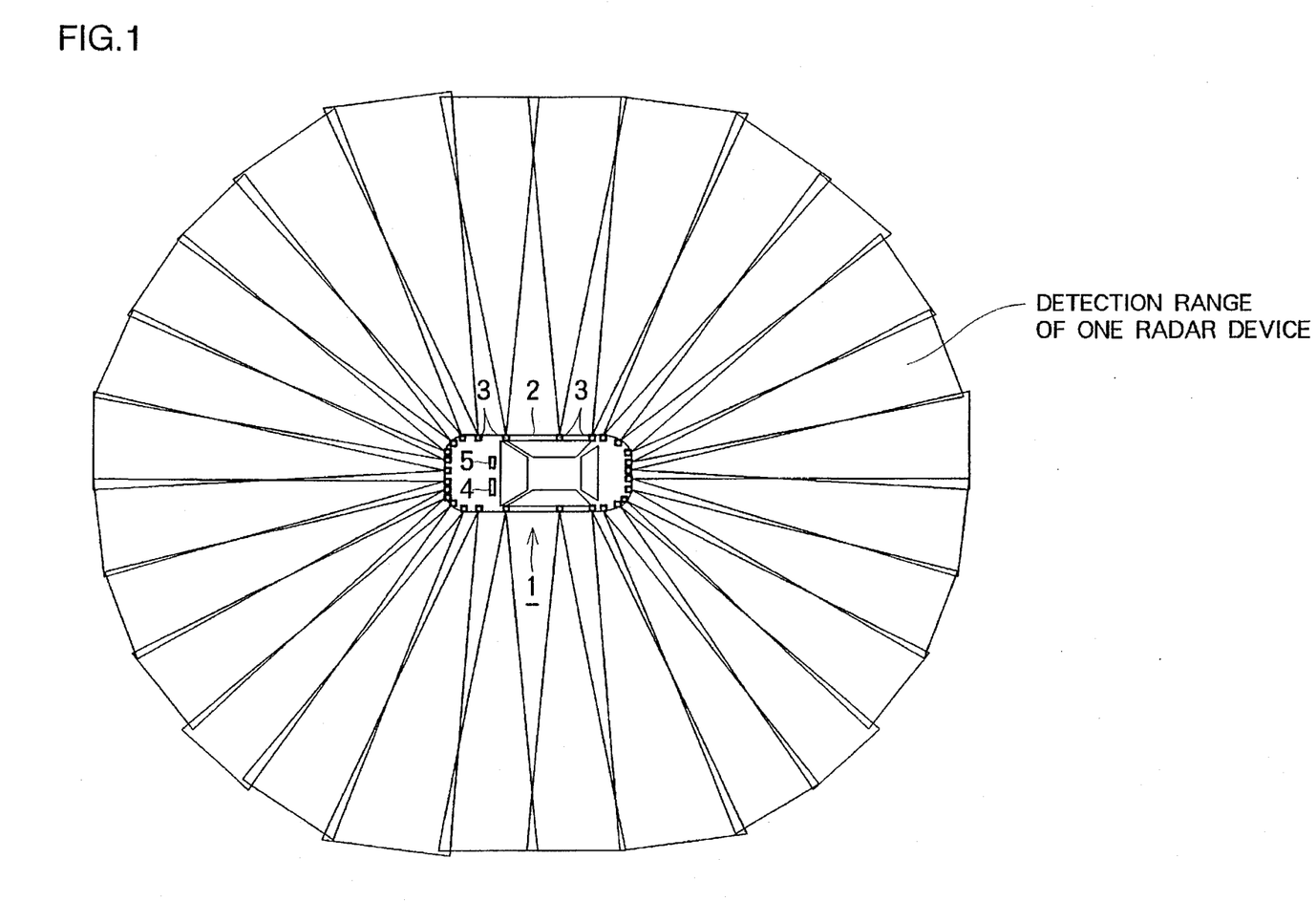
FIG. 1 is a view showing the general arrangement of a vehicle-surroundings monitoring apparatus according to an embodiment of the present invention.

FIG. 1 is a view showing the general arrangement of a vehicle-surroundings monitoring apparatus according to an embodiment of the present invention. This vehicle-surroundings monitoring apparatus 1 comprises a plurality of radar devices 3 provided on and along the periphery of a vehicle (user's vehicle) 2, a processing device 4, and a display section 5. The radar devices 3 are disposed in such a manner that their detecting ranges together cover about 360° around the vehicle 2 without substantially overlapping each other.

Figure 2:
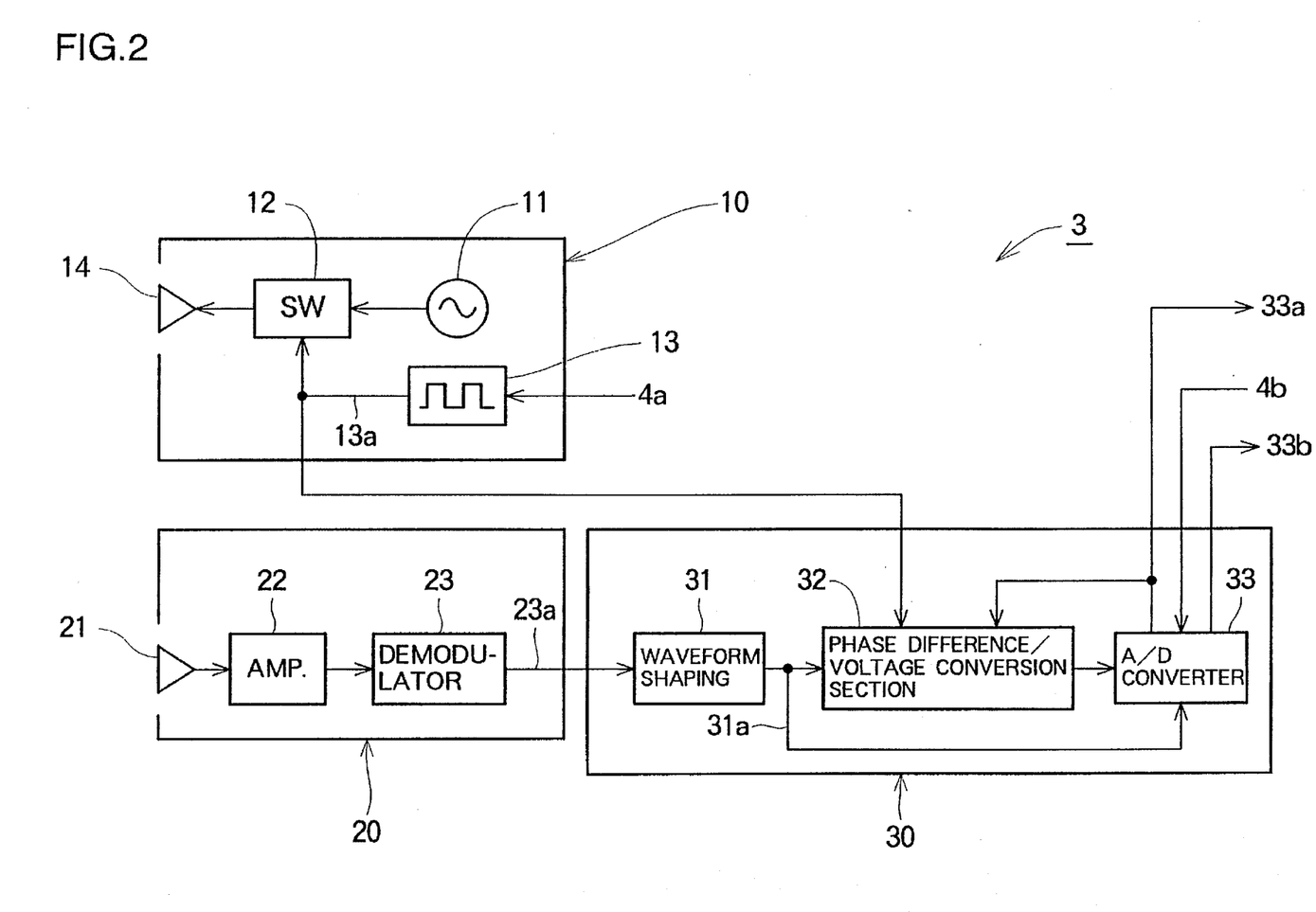
FIG. 2 is a block diagram illustrating the structure of a representative one of radar devices employed in the vehicle-surroundings monitoring apparatus of FIG. 1.

FIG. 2 is a block diagram illustrating the structure of one of of the radar devices employed in the vehicle-surroundings monitoring apparatus of FIG. 1, and it should be noted that the other radar devices are constructed in the same manner as the one shown in this figure. As illustrated, the radar device 3 comprises a set of transmitter and receiver sections 10 and 20, and a phase difference detector section 30 constituting a part of the processing device 4.

The transmitter section 10 includes a carrier wave oscillator 11, a switching section 12, a modulating pulse signal generating circuit 13 and a transmitting antenna 14, while the receiver section 20 includes a receiving antenna 21, a high-frequency amplifier circuit 22 and a demodulating circuit 23. The high-frequency amplifier circuit 22 is constructed to amplify a component of the high-frequency signal received via the receiving antenna 21 which is resonant with the carrier wave frequency. The demodulating circuit 23 demodulates the signal amplified by the high-frequency amplifier circuit 22 and supplies the demodulated signal to the phase difference detector section 30. The difference detector section 30 includes a waveform shaping circuit 31, a phase difference/voltage converting section 32 and an A/D converter.

Figure 3:
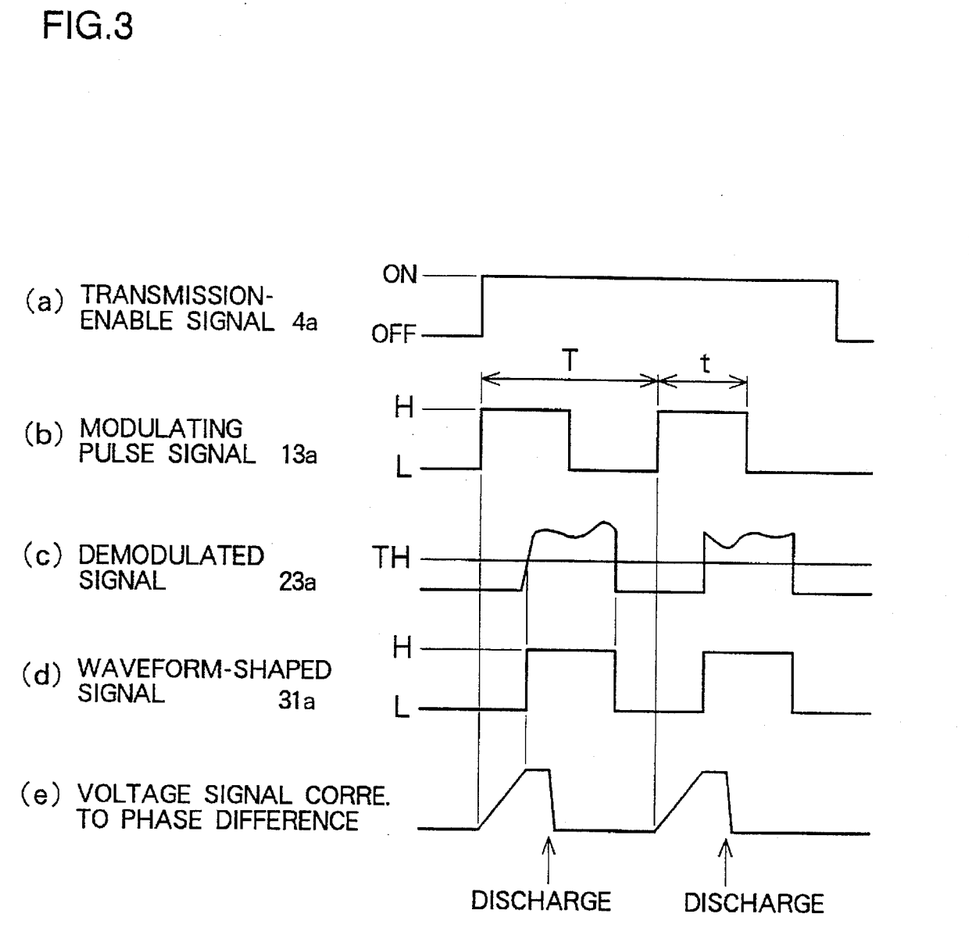
FIG. 3 is a timing chart explanatory of the operation of the radar device of FIG. 2.

FIG. 3 is a timing chart explanatory of the operation of the radar device of FIG. 2. While a transmission-enable signal 4a is being given from the processing device 4 as shown in (a) of FIG. 3, the modulating pulse signal generating circuit 13 generates a modulating pulse signal 13a having a pulse width t and a period T as shown in (b) of FIG. 3. During a time corresponding to the pulse width t of the modulating pulse signal 13a, the switching section 12 uses a high-speed switching circuit comprised of PIN diode or the like to supply a millimeter-band (e.g., 60 GHz) carrier wave signal 11a to the transmitting antenna 14, from which a pulse-modulated carrier wave 13a is radiated as an electromagnetic wave.

This embodiment is constructed in such a manner that the beam picked up via the receiving antenna 21 is the same as the transmitted beams from the transmitting antenna 14. The wave radiated via the transmitting antenna 14 and reflected from an object is picked up by the receiving antenna 21, amplified by the high-frequency amplifier circuit 22 and then demodulated by the demodulating circuit 23 so as to obtain a demodulated signal 23a as shown in (c) of FIG. 3.

The waveform shaping circuit 31 compares the level of the demodulated signal 23a and a predetermined threshold level as shown in (c) of FIG. 3, so as to generate a waveform-shaped signal 31a of logical high level while the level of the demodulated signal 23a is greater than the threshold level TH as shown in (d) FIG. 3.

The phase difference/voltage converting section 32 includes a constant-current source, a switching circuit for controlling the constant-current supply from the constant-current source, a condenser chargeable with the constant current supplied from the source, and a discharging circuit for discharging the charge of the condenser. From the time point when the modulating pulse signal 13a shown in (b) of FIG. 3 rises to the high level to the time point when the waveform-shaped signal 31a shown in (d) of FIG. 3 rises, a constant current is supplied from the constant-current source to charge the condenser. Thus, the condenser is charged to a potential corresponding to a phase difference between the modulating pulse signal 13a and the waveform-shaped signal 31a (i.e., a time difference between the transmitted and received waves), so that there is obtained a voltage signal corresponding to the phase difference (time difference).

The A/D converter 33 samples and holds the potential of the condenser at the rising edge of the waveform-shaped signal 31a so as to convert it into digital data. The discharging circuit of the phase difference/voltage converting section 32 is activated, in response to a conversion end signal 33a indicative of termination of the A/D conversion, to fully discharge the charge of the condenser and prepare for a next phase difference/voltage converting operation. The conversion end signal 33a is fed to the processing device 4, and digital data 33b corresponding to the phase difference (time difference) is output in response to a readout instruction 4b from the processing device 4. Then, the processing device 4 calculates a distance to the object on the basis of the digital data 33b representative of the phase difference (time difference).

Figure 4:
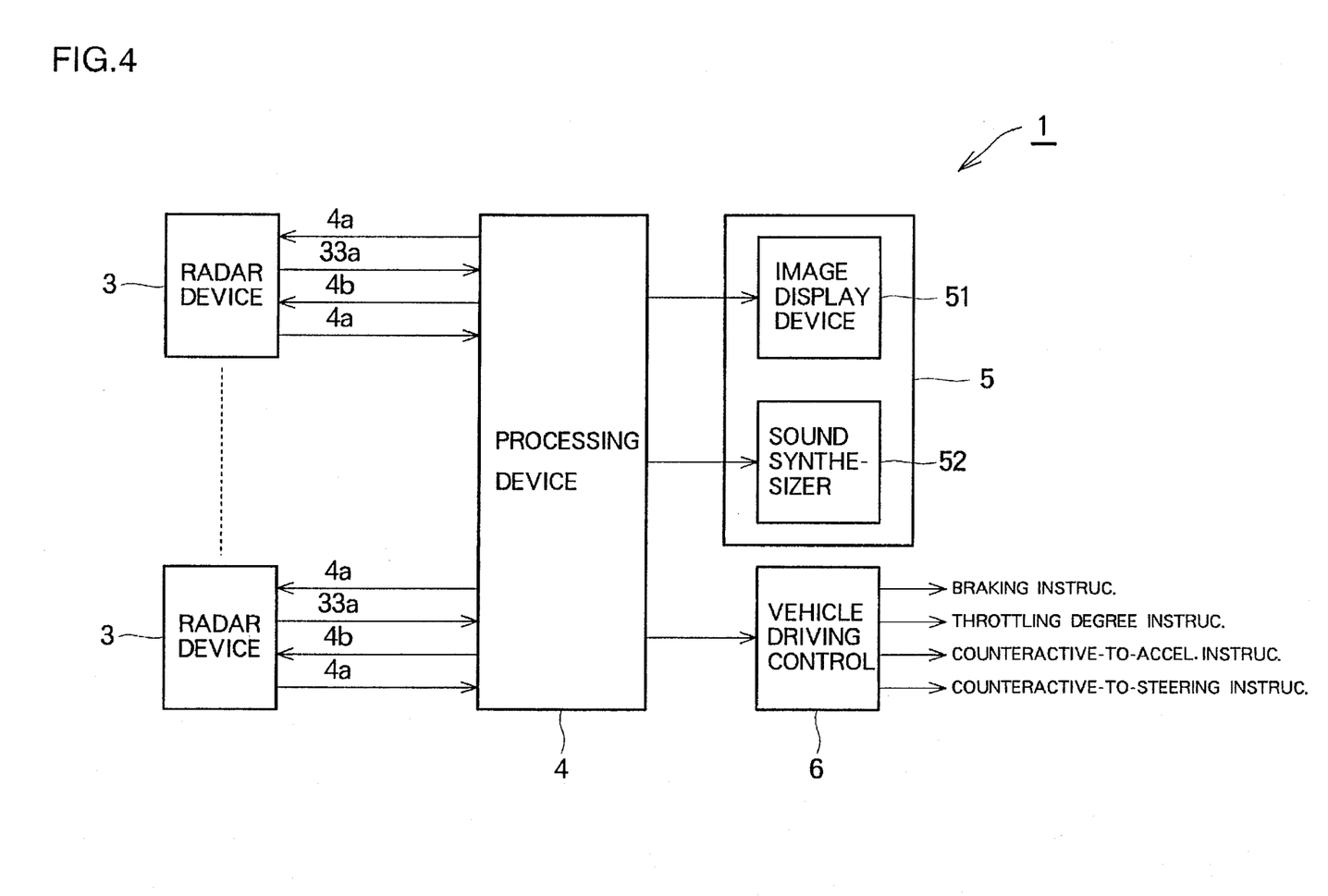
FIG. 4 is a block diagram of the general structure of the vehicle-surroundings monitoring apparatus.

FIG. 4 is a block diagram of the general structure of the vehicle-surroundings monitoring apparatus of FIG. 1. The processing device 4 repeats its operations of giving the transmission-enable signal 4a to one or more radar devices 3 so as to obtain the digital data 33b representative of a distance to an obstacle present within the respective detection ranges of the radar devices 3 and then activating one or more other radar devices 3 oriented to other directions. In this way, the processing device 4 determines presence or absence of an obstacle over the entire range (virtually 360°) around the vehicle and a distance to the obstacle if any. Although a plurality of the radar devices 3 may be activated simultaneously as mentioned above, this embodiment does not activate immediately adjoining radar devices 3 simultaneously so that an electromagnetic wave radiated from the transmitting antenna of one radar device 3 will not be received by the receiving antenna of another radar device 3. The processing device 4 updatably stores the data representative of the determined distances in all the directions.

The display section 5 includes an image display device 51 and a sound synthesizer 52. The processing device 4 visually presents, on the screen of the image display device 41, the data representative of the distance to the obstacle for each direction, and also informs by sound the presence and direction of and distance to the obstacle via the sound synthesizer 52.

Figure 5:
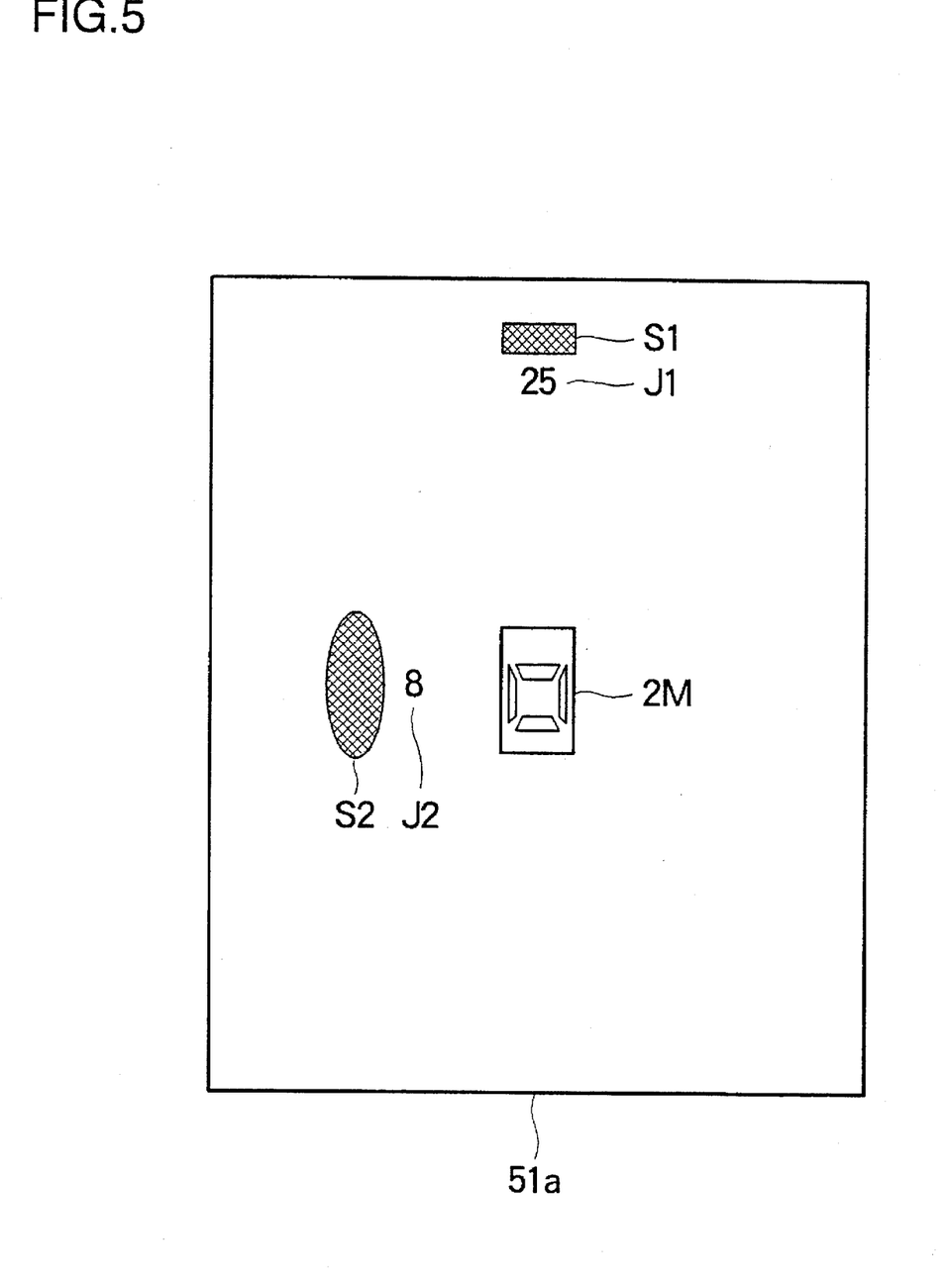
FIG. 5 is a view showing an example of an image displayed as a result of the vehicle-surroundings monitoring by the apparatus.

FIG. 5 is a view showing an example of the displayed image on the display 51. The processing device 4 in this embodiment displays a mark 2M indicating the user's vehicle on a virtually middle portion of the display screen 51a, and also marks S1 and S2 indicative of the positions of detected obstacles along with the determined distances J1 and J2 to the obstacles. Specifically, the displayed example in FIG. 5 indicates that an obstacle such as another vehicle is present 25 m ahead of the user's vehicle and still another obstacle is present 8 m away from the left side of the vehicle. Such a visual display of the ambient conditions or surroundings of the vehicle can effectively assist the vehicle operator in recognizing and judging the conditions. In addition, because the image display can show presence of an obstacle within a dead angle and a distance thereto, it can also be a good safety confirming support when the operator changes a route or lane or puts the vehicle into a garage.

Since the conditions around the vehicle are also informed by sound via the sound synthesizer 52, the vehicle operator can recognize the conditions without the need to view the image on the display 51.

Further, on the basis of the ambient conditions detected by the radar devices 3, the processing device 4 causes a vehicle driving control 6 FIG. 4 to automatically control the operation of the vehicle and apply counteractive force to the operator's stepping-on of the accelerator and steering. For instance, when the distance to a running-ahead car has become too short, the vehicle driving control 6 may output a braking instruction, or when an obstacle is present to the left of the vehicle, counteractive force may be applied to the operator's counterclockwise steering operation so that the steering wheel feels heavy enough to call the operator's attention. Further, when the cruising drive mode is selected on an expressway or the like, a throttling-degree instruction may be output, in consideration of not only the distance to a running-ahead vehicle but also the ambient conditions, to permit automatic adjustment of the vehicle velocity.

Figure 6:
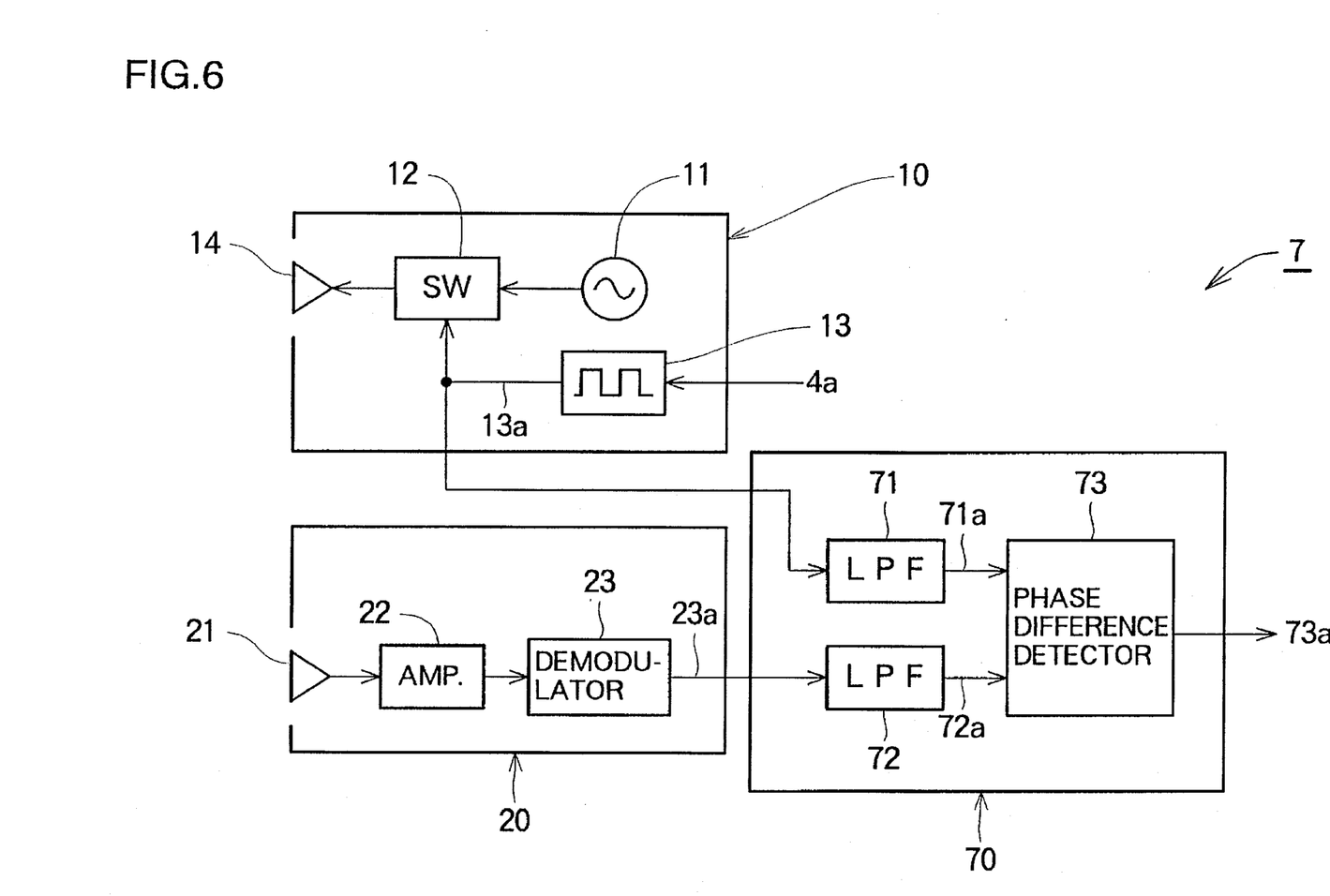
FIG. 6 is a block diagram illustrating another example of the radar device.
Figure 7:
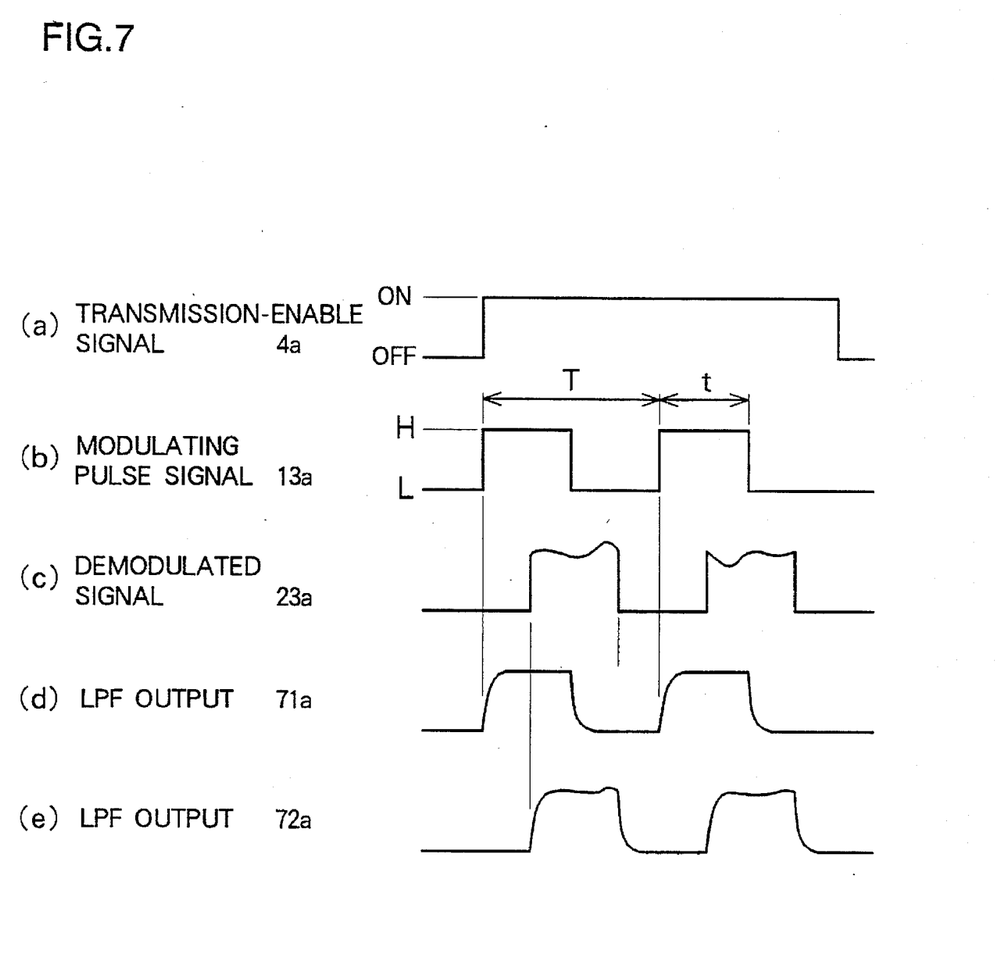
FIG. 7 is a timing chart explanatory of the operation of the radar device of FIG. 6.

FIG. 6 is a block diagram illustrating another structural example of the radar device, and FIG. 7 is a timing chart explanatory of the operation of the radar device of FIG. 6. In FIG. 6, elements denoted by same reference characters as in FIG. 2 have the same functions as their counterparts in FIG. 2 and hence will not be described in detail here. The radar device 7 is different from that of FIG. 2 in terms of the structure of a phase difference detector section 70. This phase difference detector section 70 includes two low-pass filters (LPF) 71 and 72 and a phase detector 73. A modulating pulse signal 13a is applied to the low-pass filter 71, which in turn outputs a signal 71a to the phase difference detector 73 as shown in (d) of FIG. 7. A demodulated signal 23a is applied to the other low-pass filter 72, which in turn outputs a signal 72a to the phase difference detector 73 as shown in (e) of FIG. 7. The phase difference detector 73 converts, into digital form, the respective output signals 71a and 72a from the low-pass filters 71 and 72, and detects a phase difference of the two signals on the basis of the resultant digital data to thereby output data 73a representative of the detected phase difference.

Only low-frequency components are extracted via the low-pass filters 71 and 72 out of the modulating pulse signal 13a and demodulated signal 23a containing high-frequency components, so that only the low-frequency extracted signals are then processed. Because of this, the A/D conversion in the phase difference detector 73 may be at a low speed and the detector 73 can be substantially simplified in construction and made at reduced cost.

Figure 8:
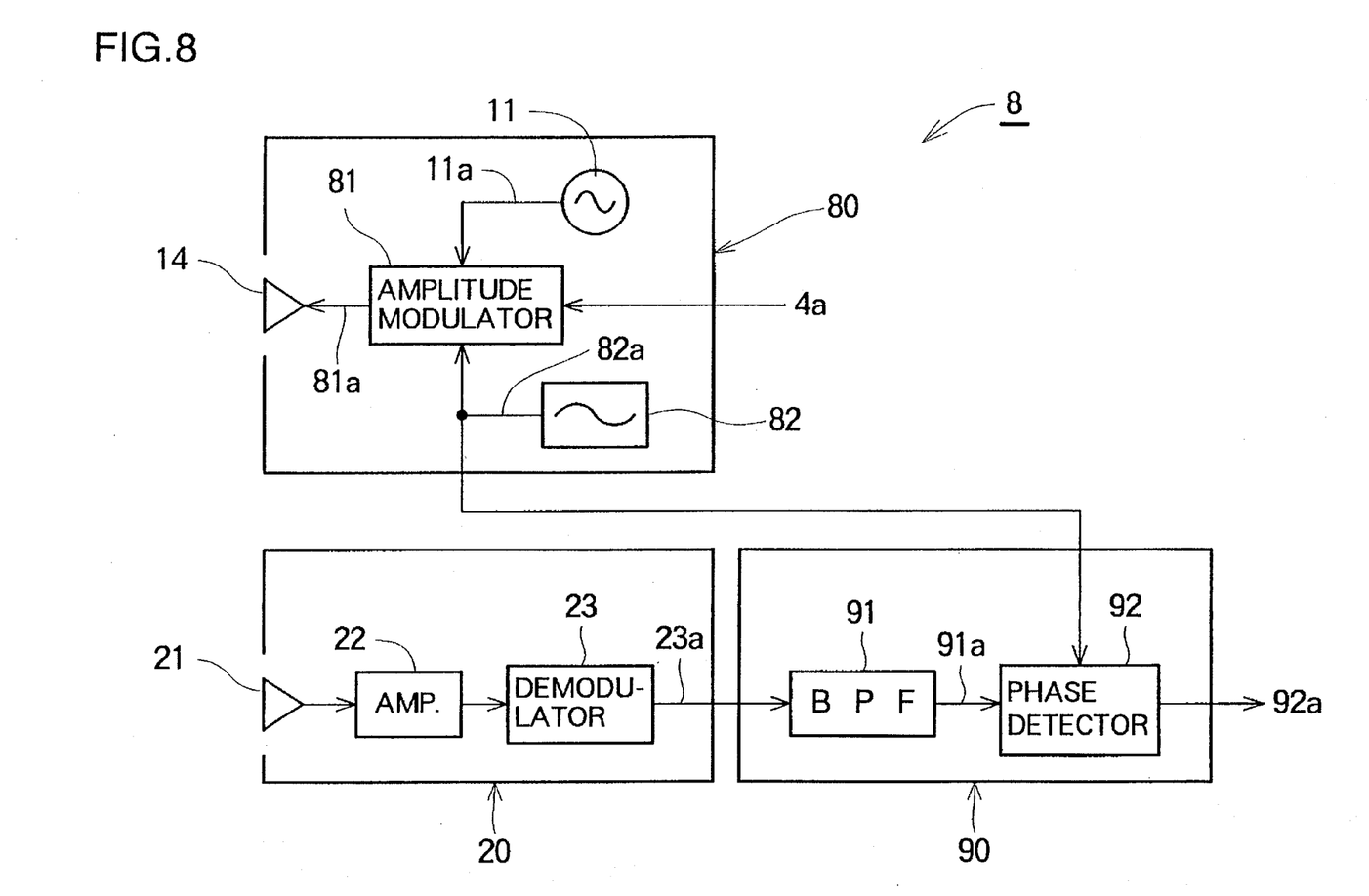
FIG. 8 is a block diagram illustrating the structure of a radar device which is based on amplitude modulation.
Figure 9:
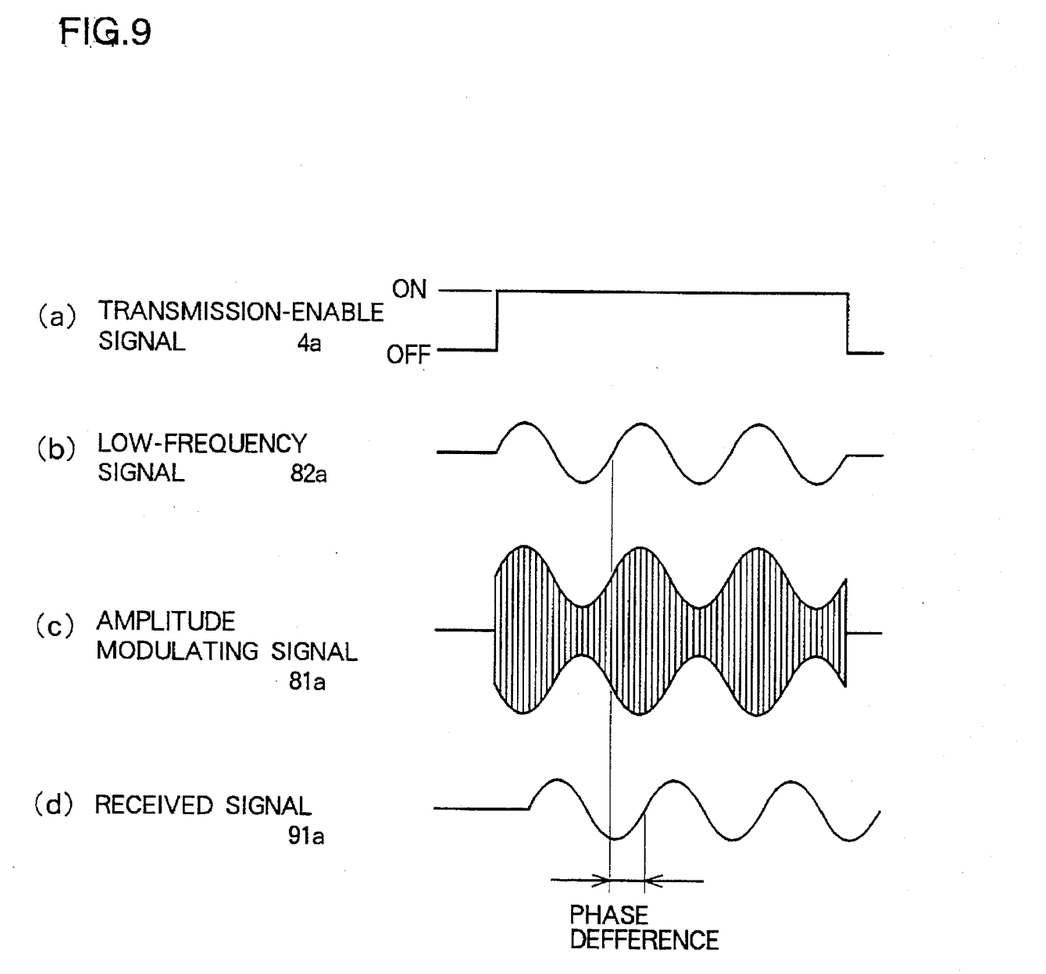
FIG. 9 is a timing chart explanatory of the operation of the amplitude-modulation-based radar device of FIG. 9.

FIG. 8 is a block diagram illustrating the structure of a radar device which is similar to those of FIGS. 2 and 6 but is different in that it is based on amplitude modulation, and FIG. 9 is a timing chart explanatory of the operation of the amplitude-modulation-based radar device of FIG. 8. In FIG. 8, elements denoted by same reference characters as in FIGS. 2 or 6 have the same functions as their counterparts in the figure and hence will not be described in detail here.

The radar device 8 of FIG. 8 is designed to radiate or transmit an electromagnetic wave produced by amplitude-modulating a carrier wave and determine a distance to an object or obstacle on the basis of a phase difference (time difference) between the transmitted signal and a signal received and demodulated at the reception end.

More Specifically, in a transmitter section 80, an amplitude modulator 81 modulates a carrier wave signal 11a generated from a carrier wave oscillator 11 with a low-frequency signal 82a generated from a low-frequency signal generator 82 so as to produce an amplitude-modulated signal 81a. While a transmission-enable signal 4a is being given, the amplitude modulator 81 supplies a transmitting antenna 14 with the amplitude-modulated signal 81a so that the antenna 14 radiates a transmission wave.

A phase difference detector section 90 includes a band-pass filter (BPF) 91 having a center band corresponding to the frequency of the low-frequency signal 82a, and a phase difference detector 92. The phase difference detector 92 determines a phase difference (time difference) between the modulating low-frequency signal 82a as shown in (b) of FIG. 9 and a received signal 91a filtered through the band-pass filter 91 to thereby output data 92a representative of the determined phase difference.

Because the phase difference detector section 90 is constructed to make a phase comparison of the low-frequency signal, necessary A/D conversion and digital operation processing may be conducted at low speed, and thus a phase difference detector 92 in the section 90 can be substantially simplified in construction and also made at reduced cost, despite the arrangement to determine the phase difference (time difference) by performing digital operations on A/D-converted signals 82a add 91a.

Figure 10:
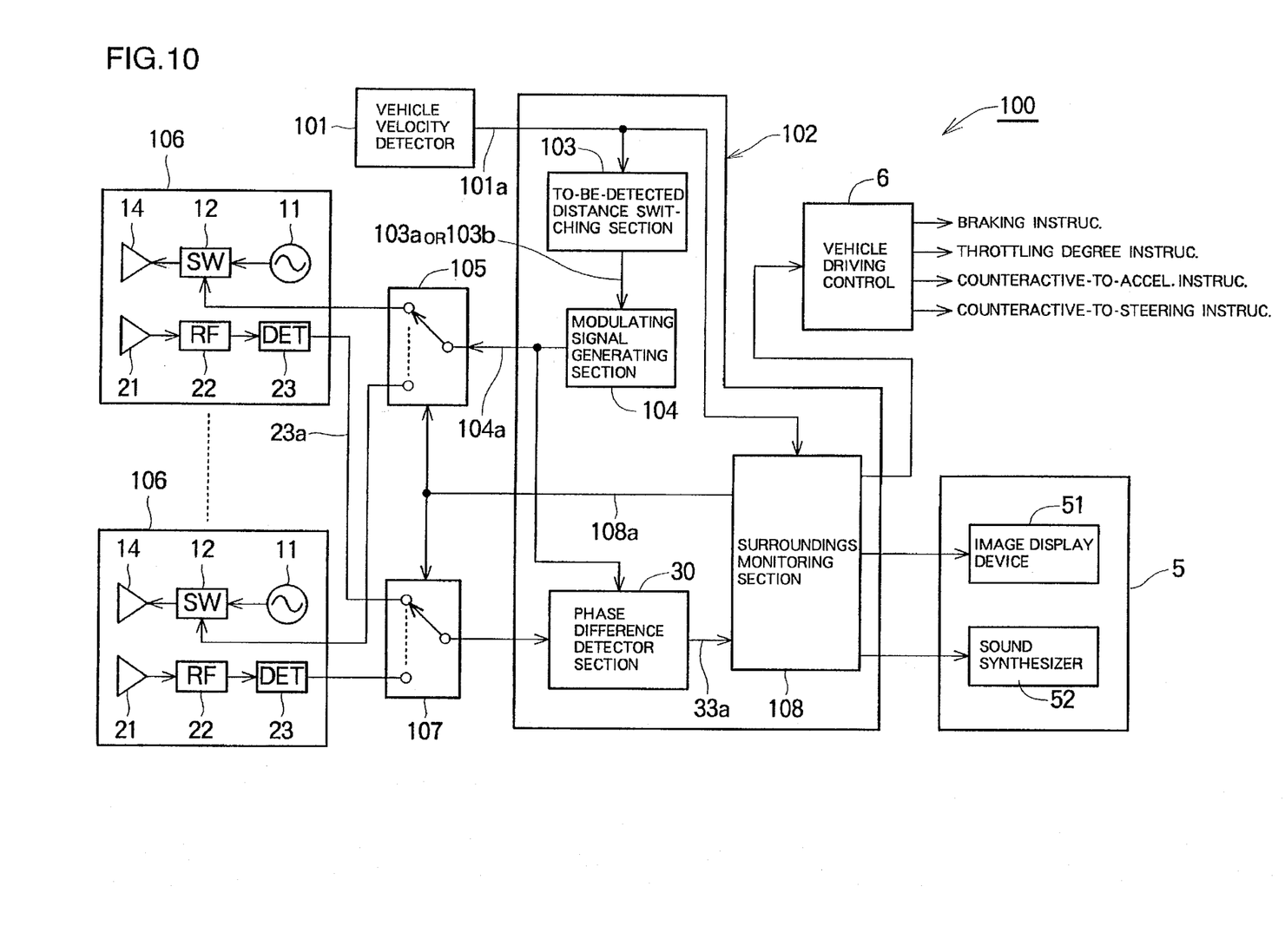
FIG. 10 is a block diagram showing the general structure of a vehicle-surroundings monitoring apparatus according to another embodiment of the present invention.

FIG. 10 is a block diagram showing the general structure of a vehicle-surroundings monitoring apparatus according to another embodiment of the present invention, in which elements denoted by same reference characters as in FIGS. 1 and 2 have the same functions as their counterparts in the figures. This vehicle-surroundings monitoring apparatus 100 is characterized in that the pulse modulating period of a transmitted wave is varied on the basis of information representative of a vehicle velocity 101a detected by a vehicle velocity detector 101.

A to-be-detected-distance switching section 103 in a processing device 102 calculates an average vehicle velocity of the user's vehicle on the basis of the vehicle velocity information 101a. When the calculated average vehicle velocity is lower than a predetermined value, the switching section 103 supplies a modulating signal Generator 104 with a modulating period instruction for short distance detection 103a, whereas when the calculated average vehicle velocity exceeds a predetermined value, the switching section 103 supplies the modulating signal generator 104 with a modulating period instruction for long distance detection 103b. When the modulating period instruction for short distance detection 103a is supplied, the modulating signal generator 104 generates a modulating signal 104a of relatively short pulse-repetition period. But, when the modulating period instruction for long distance detection 103b is supplied, the modulating signal generator 104 generates a modulating signal 104a of relatively long pulse-repetition period. In the case where the amplitude modulation is employed in transmitter and receiver sections (radar devices) 106, the period (frequency) of the amplitude-modulating low-frequency signal is varied.

Although a maximum distance capable of being detected by the embodiment is more or less limited due to the pulse modulating or amplitude modulating period, detection of distant obstacles or the like is permitted by increasing the modulating period when the vehicle is running at a high velocity. On the other hand, when the vehicle is running at a low velocity, it is allowed to reduce the time necessary for the individual transmitter and receiver sections (radar devices) 106 to monitor the ambient conditions over the entire range around the vehicle, by reducing the modulating period. The monitoring apparatus 100 thus arranged can rapidly detect and inform the vehicle operator about changing distances to any obstacles such as when the operator is putting the vehicle into a garage or changing a route or lane.

The modulating signal 104a output from the modulating signal generator 104 is sent, via a transmission switching section 105, to a switching section 12 in the transmitter and receiver section 106, so that a signal obtained by pulse-modulating a carrier wave signal supplied from a carrier wave oscillator 11 is radiated via a transmitting antenna 14 as an electromagnetic wave. A signal 23a reflected from an object to be picked up via a receiving antennal 21, amplified by a high-frequency amplifier 22 and demodulated by a demodulating circuit 23 is supplied via a receiver switching section 107 to a phase difference detector section 30. This phase difference detector section 30 detects a phase difference (time difference) between the modulating signal 104a of the transmitted wave and the received signal 23a.

In response to a monitoring-direction designating instruction 108a given from a vehicle-surroundings monitoring section 108, the transmitter switching section 105 and receiver switching section 107 select a particular set of the transmitter and receiver sections to be used for the signal transmission and reception, respectively. The vehicle-surroundings monitoring section 108 repeats its operation of determining a distance to an obstacle or the like on the basis of phase-difference representing data 33a obtained for the designated monitoring direction until the entire (360°) range surroundings are monitored, and then causes an image display device 51 to show the monitored results. Also, in response to the vehicle velocity information 101a and a detected distance to an obstacle present in the vehicle advancing direction, the monitoring section 108 also causes a sound synthesizer 52 to output a sound message to call the vehicle operator's attention.

The vehicle-surroundings monitoring section 108 is constructed to increase its monitoring frequency in a particular direction where a distance to an obstacle has been detected as very short or there has been detected another vehicle or an obstacle which is approaching the user's vehicle rapidly. More specifically, in the initial state immediately after the start of the monitoring operation and when no obstacle is detected around the user's vehicle, the monitoring section 108 sequentially performs monitoring in the individual directions in accordance with a preset monitoring order. However, upon detecting an obstacle in a particular direction to which the operator's attention should be paid, the monitoring section 108 more frequently activates the transmitter and receiver sections oriented to that particular direction for strengthened monitoring, so as to give a warning message at earlier timing or more rapidly issue a braking instruction for slowing down the vehicle.

As has been described in detail thus far, the vehicle-surroundings monitoring apparatus in accordance with the present invention is characterized by the provision of a plurality of transmitter and receiver sections or radar devices on and along the entire periphery of a vehicle so as to permit detection of any obstacles over the entire range around the vehicle.

Further, with the arrangement that an electromagnetic wave obtained by pulse-modulating or amplitude-modulating a carrier wave is transmitted and a distance to an obstacle is determined on the basis of a phase difference between a modulating signal of the transmitted wave and a demodulated signal obtained by demodulating the reflected wave, it is possible to substantially simplify the construction of the transmitter and receiver sections and processing device.

Although the maximum detection range may be limited by the pulse-repetition or amplitude-modulating period, distant obstacles can be accurately detected by increasing the modulating period, when the vehicle is at a high velocity. Further, when the vehicle is at a low velocity, it is possible to reduce a time necessary for the plurality of the transmitter and receiver sections to monitor over the entire range around the vehicle, so that a varying distance to an obstacle can be detected and informed to the vehicle operator very rapidly.

What is claimed is:

1. A vehicle-surroundings monitoring apparatus comprising:

a plurality of transmitter and receiver means provided on and along a periphery of a vehicle, each of said transmitter means transmitting an electromagnetic wave, each of said receiver means receiving a reflected wave from an object;

processing means for determining current conditions around the vehicle on the basis of received signals obtained from respective reflected waives picked up by the plurality of said receiver means;

display means for informing an operator of the vehicle about the current conditions determined by said processing means; and each of said transmitter means radiates the electromagnetic wave obtained by pulse-modulating or amplitude-modulating a carrier wave, and each of said receiver means demodulates the received signal to output a demodulated signal, and wherein said processing means determines a distance to the obstacle on the basis of a phase difference between a signal used for modulating the carrier wave and the demodulated signal.

2. A vehicle-surroundings monitoring apparatus comprising:

a plurality of transmitters and receivers provided on and along a periphery of a vehicle, each of said transmitters for transmitting an electromagnetic wave, and each of said receivers for receiving a reflected wave from an object;

a processor for determining current conditions around the vehicle on the basis of received signals obtained from respective reflected waves picked up by the plurality of said receivers;

a display for informing an operator of the vehicle about the current conditions determined by said processor; and each of said transmitters radiates the electromagnetic wave obtained by pulse-modulating or amplitude-modulating a carrier wave, and each of said receivers demodulates the received signal to output a demodulated signal, and wherein said processor determines a distance to the obstacle on the basis of a phase difference between a signal used for modulating the carrier wave and the demodulated signal.

3. A vehicle-surroundings monitoring apparatus as defined in claim 2 wherein a modulating period of the carrier wave is varied in accordance with a velocity of the vehicle.

* * * * *